(12) United States Patent
Schatz

(10) Patent No.: US 11,808,062 B2
(45) Date of Patent: *Nov. 7, 2023

(54) HANDLE ASSEMBLY FOR VEHICULAR CLOSURE PANELS HAVING INTEGRATED ANTENNA AND FORCE SENSOR CONFIGURATION

(71) Applicant: Magna Mirrors of America, Inc., Holland, MI (US)

(72) Inventor: Kurt Matthew Schatz, Uxbridge (CA)

(73) Assignee: Magna Mirrors of America, Inc., Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/148,455

(22) Filed: Dec. 30, 2022

(65) Prior Publication Data

US 2023/0135008 A1 May 4, 2023

Related U.S. Application Data

(63) Continuation of application No. 16/949,757, filed on Nov. 13, 2020, now Pat. No. 11,542,732.

(60) Provisional application No. 62/991,169, filed on Mar. 18, 2020, provisional application No. 62/935,381, filed on Nov. 14, 2019.

(51) Int. Cl.
*E05B 81/78* (2014.01)
*E05B 85/10* (2014.01)
*G07C 9/00* (2020.01)
*B60R 25/24* (2013.01)

(52) U.S. Cl.
CPC .............. *E05B 81/78* (2013.01); *B60R 25/245* (2013.01); *E05B 85/10* (2013.01); *G07C 9/00309* (2013.01); *G07C 2009/00317* (2013.01)

(58) Field of Classification Search
CPC ........ E05B 81/78; E05B 85/10; B60R 25/245; G07C 9/00309; G07C 2009/00317
See application file for complete search history.

(56) References Cited

U.S. PATENT DOCUMENTS

| 6,977,619 | B2 | 12/2005 | March et al. |
| 7,283,034 | B2 | 10/2007 | Nakamura et al. |
| 7,637,631 | B2 | 12/2009 | McDermott et al. |
| 7,911,321 | B2 | 3/2011 | Bingle et al. |
| 8,400,265 | B2 | 3/2013 | Sarioglu et al. |
| 8,786,401 | B2 | 7/2014 | Sobecki et al. |

(Continued)

FOREIGN PATENT DOCUMENTS

| CN | 108608939 A | 10/2018 |
| WO | 2019240794 A1 | 12/2019 |

*Primary Examiner* — Nabil H Syed
(74) *Attorney, Agent, or Firm* — HONIGMAN LLP

(57) ABSTRACT

A vehicular door handle assembly includes a handle portion, and first and second sensors disposed within the handle portion. The first sensor is configured to communicate with a remote device. The second sensor is configured to sense force applied at a deformable portion of an outer wall of the handle portion. The first sensor, responsive to communication with the remote device, communicates a first signal to an electronic control unit. The second sensor communicates a second signal to the electronic control unit for controlling the vehicular door handle assembly responsive to sensing by the second sensor of force applied by a user at the deformable portion of the outer wall. Responsive to the first signal and responsive to the second signal, the electronic control unit allows the door of the vehicle to be opened by the user.

44 Claims, 13 Drawing Sheets

Handle Integration

(56) References Cited

U.S. PATENT DOCUMENTS

| | | | |
|---|---|---|---|
| 9,441,403 | B2 | 9/2016 | Kraus et al. |
| 9,484,626 | B2 | 11/2016 | Dykhouse |
| 9,696,839 | B1 | 7/2017 | Bingle et al. |
| 9,925,953 | B2 | 3/2018 | Pribisic et al. |
| 10,394,393 | B2 | 8/2019 | Ramakrishnan et al. |
| 10,415,276 | B2 | 9/2019 | Bussis et al. |
| 10,569,697 | B2 | 2/2020 | Huizen et al. |
| 11,542,732 | B2 | 1/2023 | Schatz |
| 2003/0029210 | A1 | 2/2003 | Budzynski et al. |
| 2014/0292004 | A1 | 10/2014 | Ruse |
| 2016/0326778 | A1 | 11/2016 | Musat |
| 2017/0152687 | A1 | 6/2017 | Koizumi et al. |
| 2017/0167180 | A1 | 6/2017 | Bingle et al. |
| 2017/0260778 | A1 | 9/2017 | Witte et al. |
| 2018/0058837 | A1 | 3/2018 | Dektor et al. |
| 2019/0101634 | A1 | 4/2019 | Baheti et al. |
| 2019/0152433 | A1 | 5/2019 | Cumbo |
| 2020/0011096 | A1 | 1/2020 | Leonardi et al. |
| 2020/0102773 | A1 | 4/2020 | Sobecki |
| 2020/0130646 | A1 | 4/2020 | Peterson |

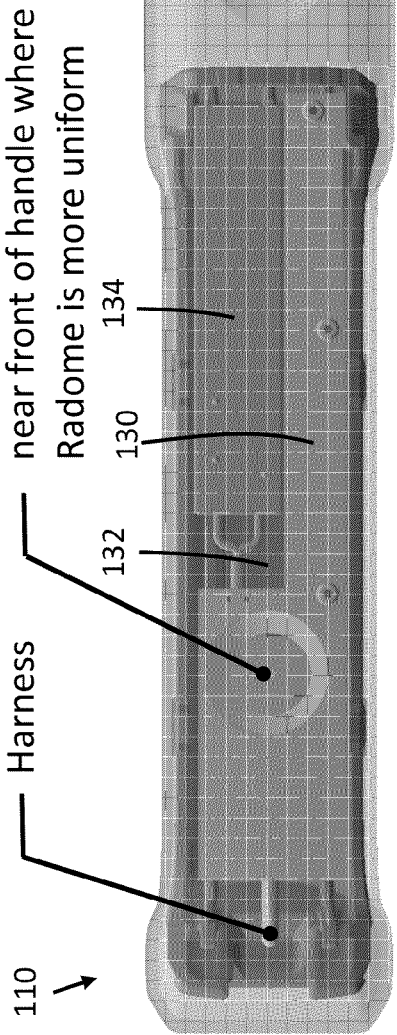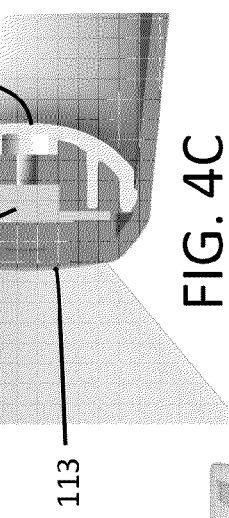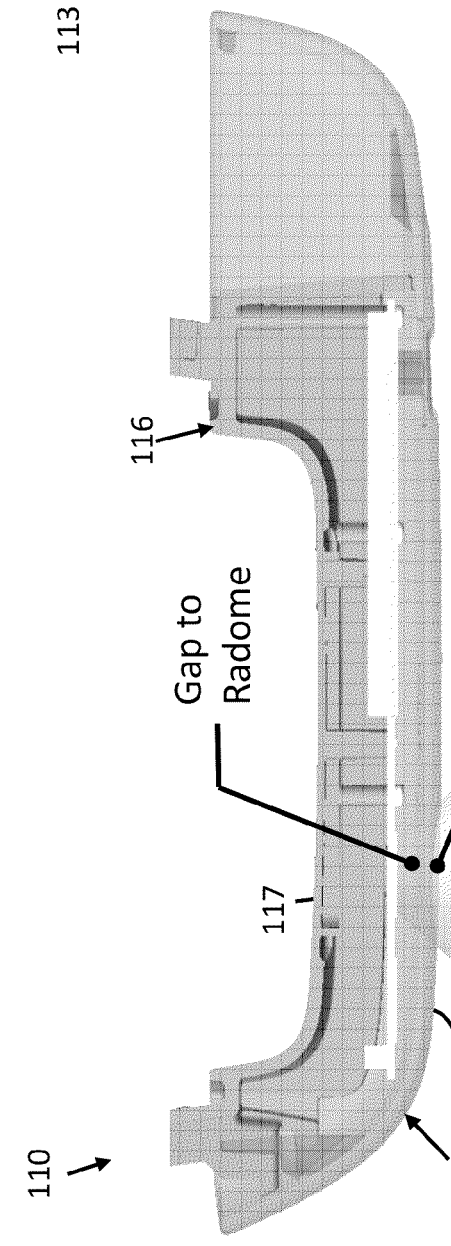

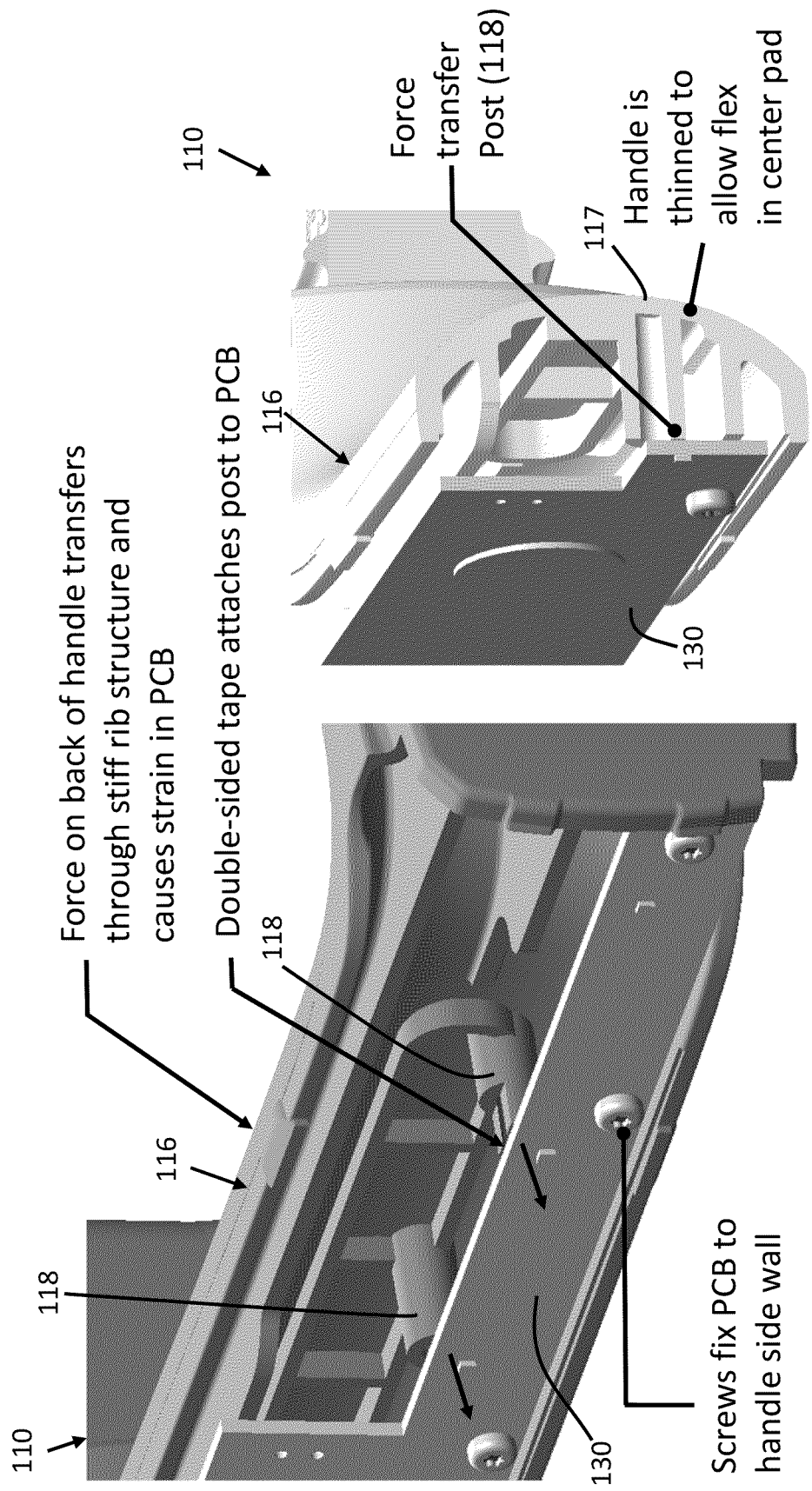

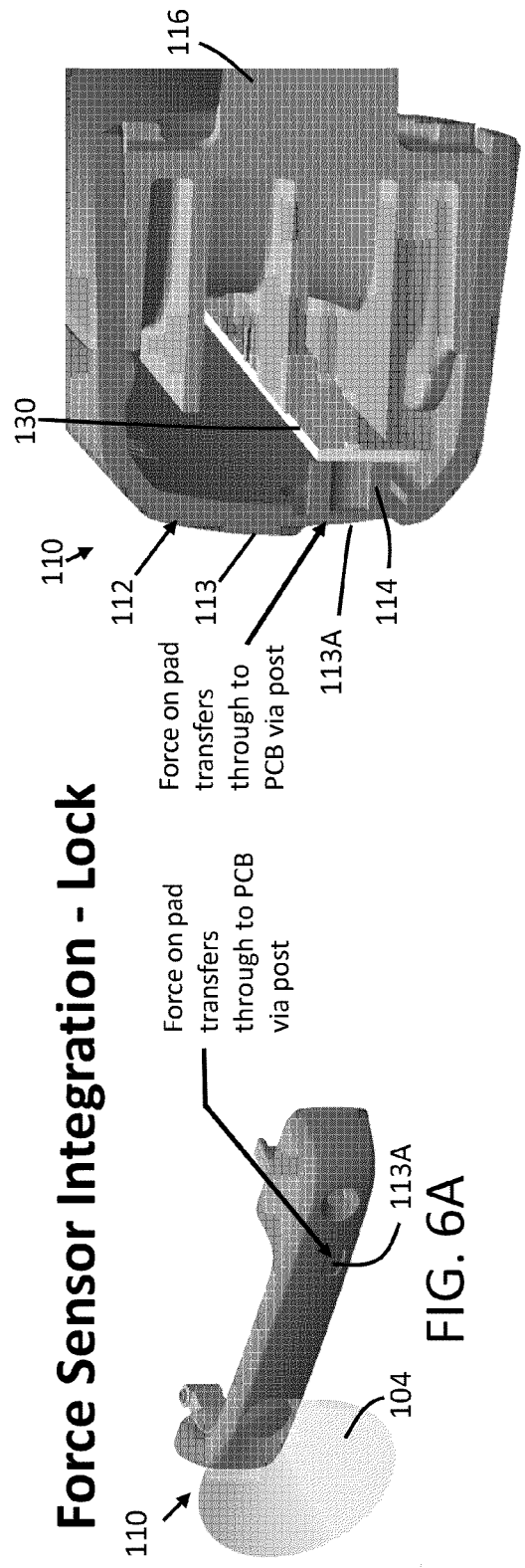
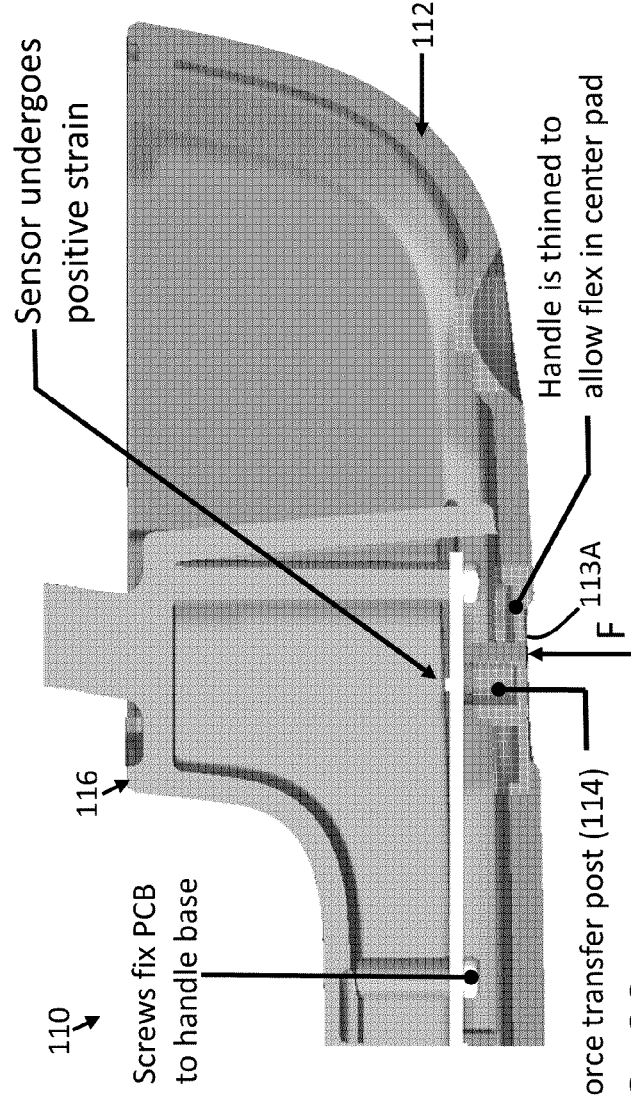
FIG. 6A  
FIG. 6B  
FIG. 6C

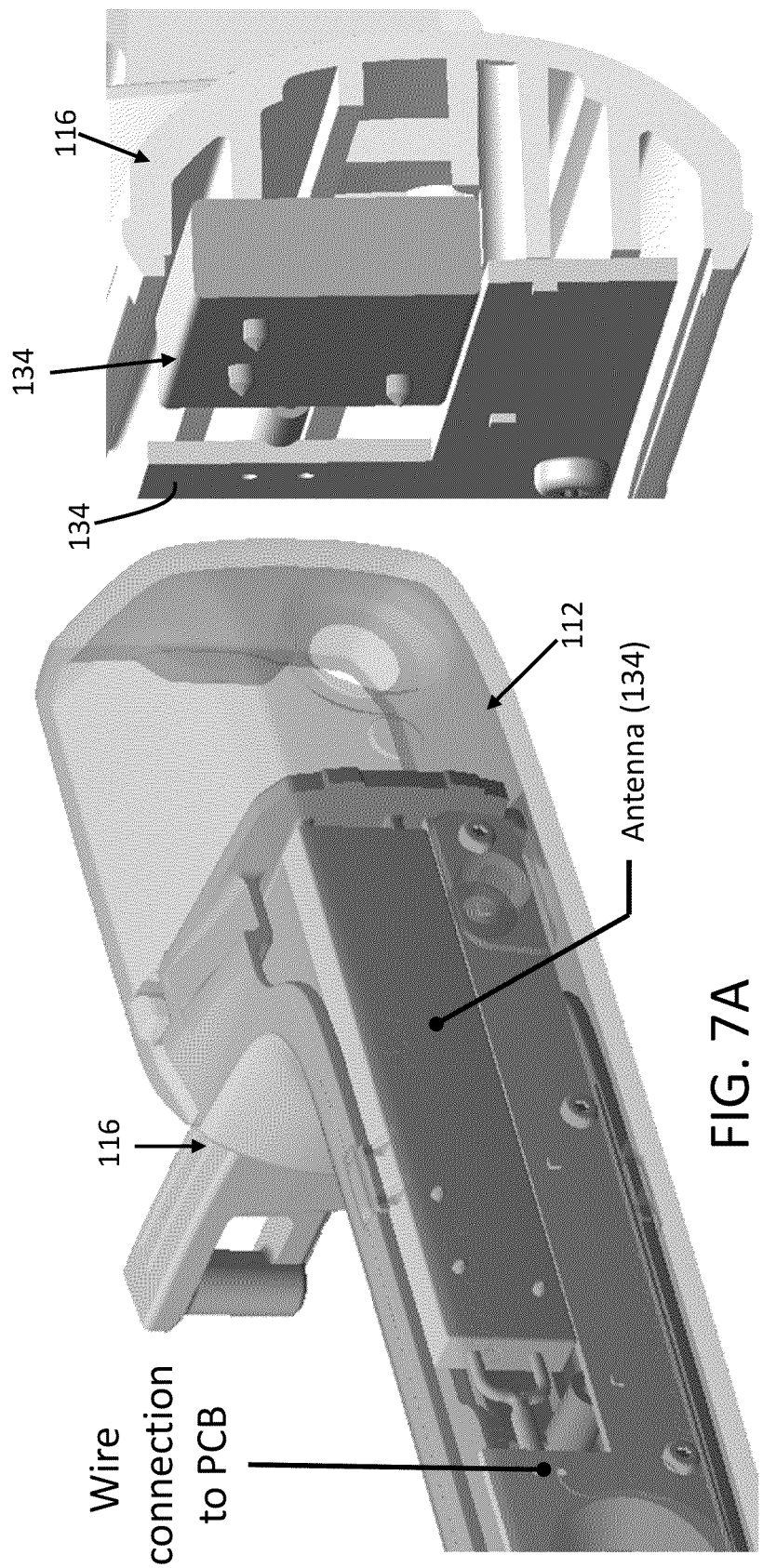

Location 1: 1 finger @ 10N Strain = 1.1 x 10^-5

Location 2: 1 finger @ 10N Strain = 6.4 x 10^-4

HANDLE ASSEMBLY FOR VEHICULAR CLOSURE PANELS HAVING INTEGRATED ANTENNA AND FORCE SENSOR CONFIGURATION

CROSS REFERENCE TO RELATED APPLICATIONS

The present application is a continuation of U.S. Pat. Application Ser. No. 16/949,757, filed Nov. 13, 2020, now U.S. Pat. No. 11,542,732, which claims the filing benefits of U.S. Provisional Application Ser. No. 62/991,169, filed Mar. 18, 2020, and U.S. Provisional Application Ser. No. 62/935,381, filed Nov. 14, 2019, which are hereby incorporated herein by reference in their entireties.

FIELD

The present disclosure relates to an electronic handle assembly for a vehicle closure.

BACKGROUND

This section provides background information related to the present disclosure which is not necessarily prior art.

Electronic latch systems, also called smart latches, are becoming increasingly attractive for vehicle manufacturers to replace mechanical linkages between handles and other hardware with latch mechanisms in vehicle closures, such as doors and lift gates or tailgates. A capacitive sensor, such as a touch pad, can be used to replace external handle switch in such a smart latch system, for example, for entry of a code sequence to open, lock, or unlock the door, or a swipe or wave hand gesture. However, capacitive sensors have several disadvantages, such as susceptibility to moisture from rain, melting snow or spilled beverages, which can render switches that use capacitive sensors useless. Further, false activations, due to water presence over the capacitive sensor for example, may unintentionally cause the release or activation of the smart latch. Capacitive sensors are also ineffective at detecting touches by hands covered by items such as gloves or bandages.

Many passenger vehicles and trucks are now equipped with keyless entry systems that function alone or in combination with a traditional mechanical-type (i.e., key) entry system. In many instances, the keyless entry system includes a portable device, such as a key fob, having pushbuttons that can be manipulated to unlock/lock the vehicle doors as well as perform other functions (e.g., opening a trunk or lift gate, selective activation of alarms, and/or the ignition system) through encoded RF signals transmitted to a vehicle-installed receiver. Typically, the signals supplied to the receiver are primarily used to control the selective locking and unlocking of a power-operated door latch mechanism.

Certain vehicles may be equipped with a vehicle-mounted keyless entry system. Typically, a touch device, such as a keypad, is mounted to the vehicle in close proximity to the door handle (e.g., on the door or the B-pillar) which enables an authorized user to enter a passcode consisting of a sequence of alpha or numerical codes. Upon verification of the passcode, an on-board controller unit controls operation of the power-operated door latch mechanism. The keypad may also be used to control other vehicle operational functions such as, for example, power release of the gas tank cover or the tailgate lift system following entry and verification of the correct passcode. Some keypads use pushbuttons and/or switches to enter the authentication code. One example of a touchless keyless entry keypad associated with a vehicle entry system is disclosed in U.S. Pat. No. 8,400,265, the entire disclosure of which is herein incorporated by reference. As disclosed in U.S. Pat. No. 8,400,265, a plurality of proximity sensors, such as capacitive sensors, are used as the code input interfaces associated with the keypad.

Still other vehicles may be equipped with a passive keyless entry (PKE) system which utilizes a transmitter carried by the user to provide a signal to the vehicle mounted receiver for controlling activation of the power-operated door latch mechanism with some limited tactile input from the user. Typically, close proximity of the transmitter to the vehicle and a single action, such as touching the door handle or waving in proximity to a motion detector, act to control the locking and unlocking function of the vehicle door. While such keyless entry systems have found widespread applications in vehicle door systems (i.e., passenger doors, tailgates and closure doors), a need exists to continually advance the art and address known deficiencies associated with conventional keyless entry systems.

Another need to be addressed includes non-contact object detection (NCOD) using sensors mounted in a vehicle and simultaneously providing a smooth appearance on the vehicle. Radar sensors are commonly used for non-contact object detection in vehicles. Vehicles commonly include external components such as handles or side light modules that may be used to house one or more components of a radar sensor. However, such external components present several considerations, such as limited packaging space and transmission of RF radiation through any structure overlying the radar sensor.

SUMMARY

This section provides a general summary of the disclosure, and is not a comprehensive disclosure of its full scope or all of its features.

In accordance with one aspect of the disclosure, a vehicle exterior component of a vehicle includes a class-A surface disposed over a force-based sensor responsive to a force applied to the class-A surface, with the class-A surface including an outer surface facing outwardly from the vehicle, and with an antenna disposed within the vehicle exterior component adjacent to the outer surface and configured to transmit or to receive radio-frequency (RF) radiation through the outer surface.

In accordance with one aspect of the disclosure, the class-A surface presents a smooth and uninterrupted surface in a region around the force-based sensor. In accordance with one aspect of the disclosure, the class-A surface is configured to deform to transmit a force applied thereto to the force-based sensor.

In accordance with one aspect of the disclosure, the vehicle exterior component includes a handle assembly defining the class-A surface, and the handle assembly is coupled to a closure of the vehicle. In accordance with one aspect of the disclosure, the handle assembly is pivotally coupled to the closure of the vehicle.

It In accordance with one aspect of the disclosure, the antenna of the vehicle exterior component includes at least one of a short-range RADAR antenna and a passive keyless entry (PKE) antenna configured to receive a radio-frequency (RF) signal from a device located outside of the vehicle. In accordance with one aspect of the disclosure, the antenna includes both of the short-range RADAR antenna and the passive keyless entry (PKE) antenna. In accordance with one aspect of the disclosure, the short-range RADAR antenna, the passive keyless entry (PKE) antenna, and the force-based sensor are all disposed in a common plane.

In accordance with another aspect of the disclosure, the force-based sensor of the vehicle exterior component is responsive to a force applied to the outer surface.

In accordance with another aspect of the disclosure, the class-A surface of the vehicle exterior component includes an inner surface facing inwardly toward the vehicle, and the force-based sensor is responsive to a force applied to the inner surface. In accordance with another aspect of the disclosure, the force-based sensor includes a force-sensitive printed circuit board (PCB), and the antenna is disposed in a common plane with the force-sensitive printed circuit board (PCB).

In accordance with another aspect of the disclosure, the vehicle exterior component includes a post extending into the vehicle exterior component away from the class-A surface and configured to apply force to the force-based sensor in response to the force applied to the class-A surface.

In accordance with another aspect of the disclosure, a handle assembly for a closure of a vehicle includes a force-based sensor responsive to a force applied thereto, and an antenna disposed within the handle assembly adjacent to an outer surface and configured to transmit or to receive radio-frequency (RF) radiation through the outer surface.

In accordance with another aspect of the disclosure, the outer surface of the handle assembly is configured to deform to transmit a force applied thereto to the force-based sensor. In accordance with another aspect of the disclosure, the handle assembly is pivotally coupled to the closure of the vehicle.

In accordance with another aspect of the disclosure, the antenna of the handle assembly includes at least one of a short-range RADAR antenna and a passive keyless entry (PKE) antenna configured to receive a radio-frequency (RF) signal from a device located outside of the vehicle. In accordance with another aspect of the disclosure, the antenna of the handle assembly includes both of the short-range RADAR antenna and the passive keyless entry (PKE) antenna. In accordance with another aspect of the disclosure, the short-range RADAR antenna, the passive keyless entry (PKE) antenna, and the force-based sensor are all disposed in a common plane.

In accordance with another aspect of the disclosure, the handle assembly further includes an inner surface facing inwardly toward the vehicle, and the force-based sensor is responsive to a force applied to the inner surface.

In accordance with another aspect of the disclosure, the force-based sensor of the handle assembly includes a force-sensitive printed circuit board (PCB), and the antenna is disposed in a common plane with the force-sensitive printed circuit board (PCB).

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4A is a partially transparent front view of a handle assembly in accordance with an embodiment of the disclosure;

FIG. 4B is a cut-away top view of the handle assembly of FIG. 4A;

FIG. 4C is a cut-away side view of the handle assembly of FIG. 4A;

FIG. 5A is a perspective view of parts within a handle assembly in accordance with an embodiment of the disclosure;

FIG. 5B is a cut-away perspective view of the handle assembly of FIG. 5A;

FIG. 6A is a perspective view of a handle assembly in accordance with an embodiment of the disclosure;

FIG. 6B is a cut-away side view of the handle assembly of FIG. 6A;

FIG. 6C is a cut-away top view of the handle assembly of FIG. 6A;

FIG. 7A is a partially transparent perspective view of a portion of a handle assembly in accordance with an embodiment of the disclosure;

FIG. 7B is a cut-away side view of the handle assembly of FIG. 7A;

Corresponding reference numerals indicate corresponding parts throughout the several views of the drawings.

DETAILED DESCRIPTION

Figure 1A:
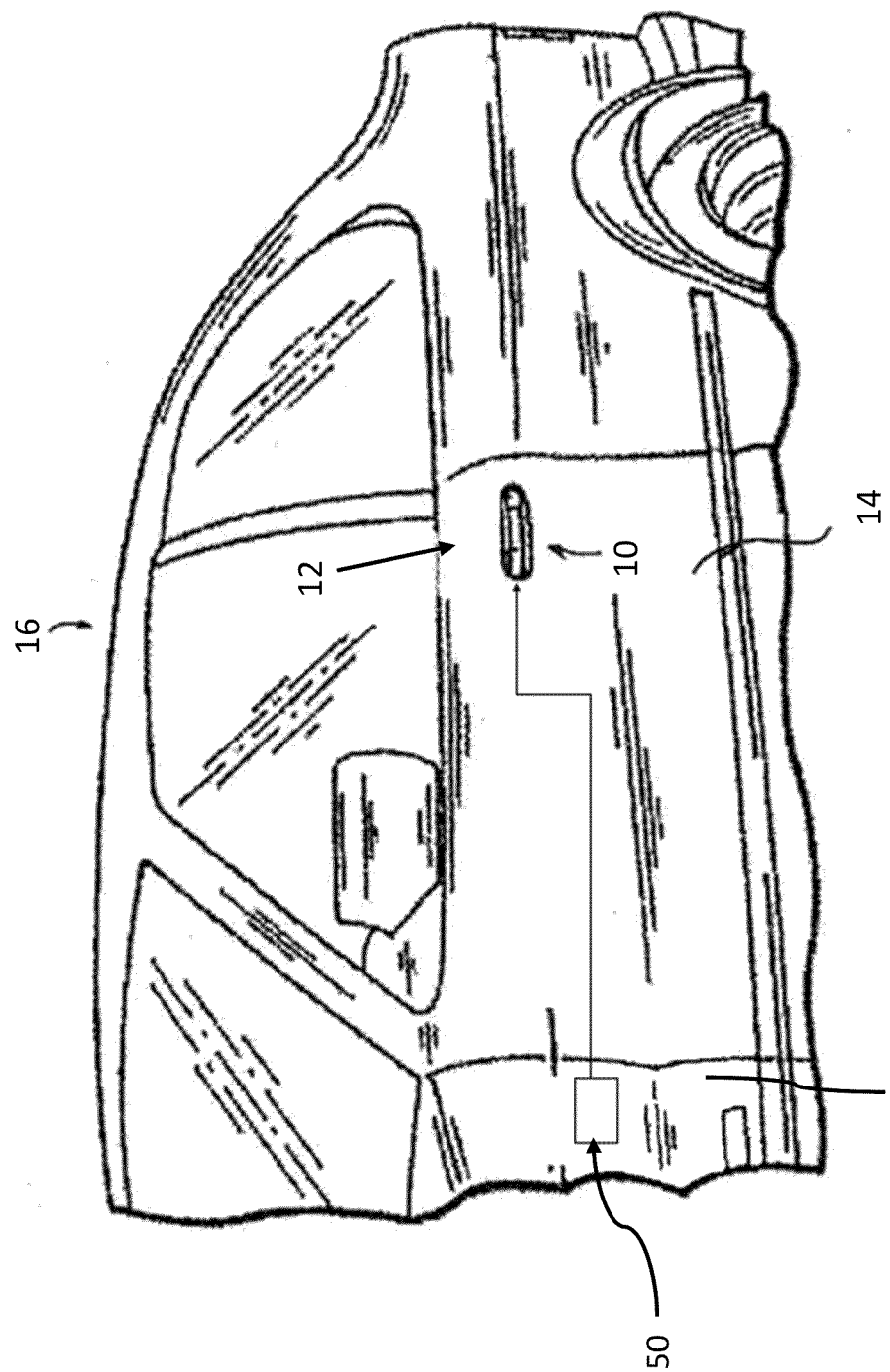
FIG. 1A is a partial perspective view of a vehicle.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present disclosure provides for a vehicle exterior component of a vehicle that includes wall or structure having a class-A surface disposed over a force-based sensor responsive to a force applied at the class-A surface (such as responsive to a force at or above a threshold force, such as, for example, at or above 5 N or at or above 10 N or at or above 20 N or any other suitable threshold force detected at the component), and an antenna disposed within the vehicle exterior component adjacent to the outer surface and configured to transmit or to receive radio-frequency (RF) radiation through the outer surface. A handle assembly for a closure of a vehicle is shown and described as an example vehicle exterior component. However, the exterior vehicle component may take other forms, such as an applique, a keypad, or a region or housing of a closure or other vehicle component, such as an exterior mirror.

Figure 1B:
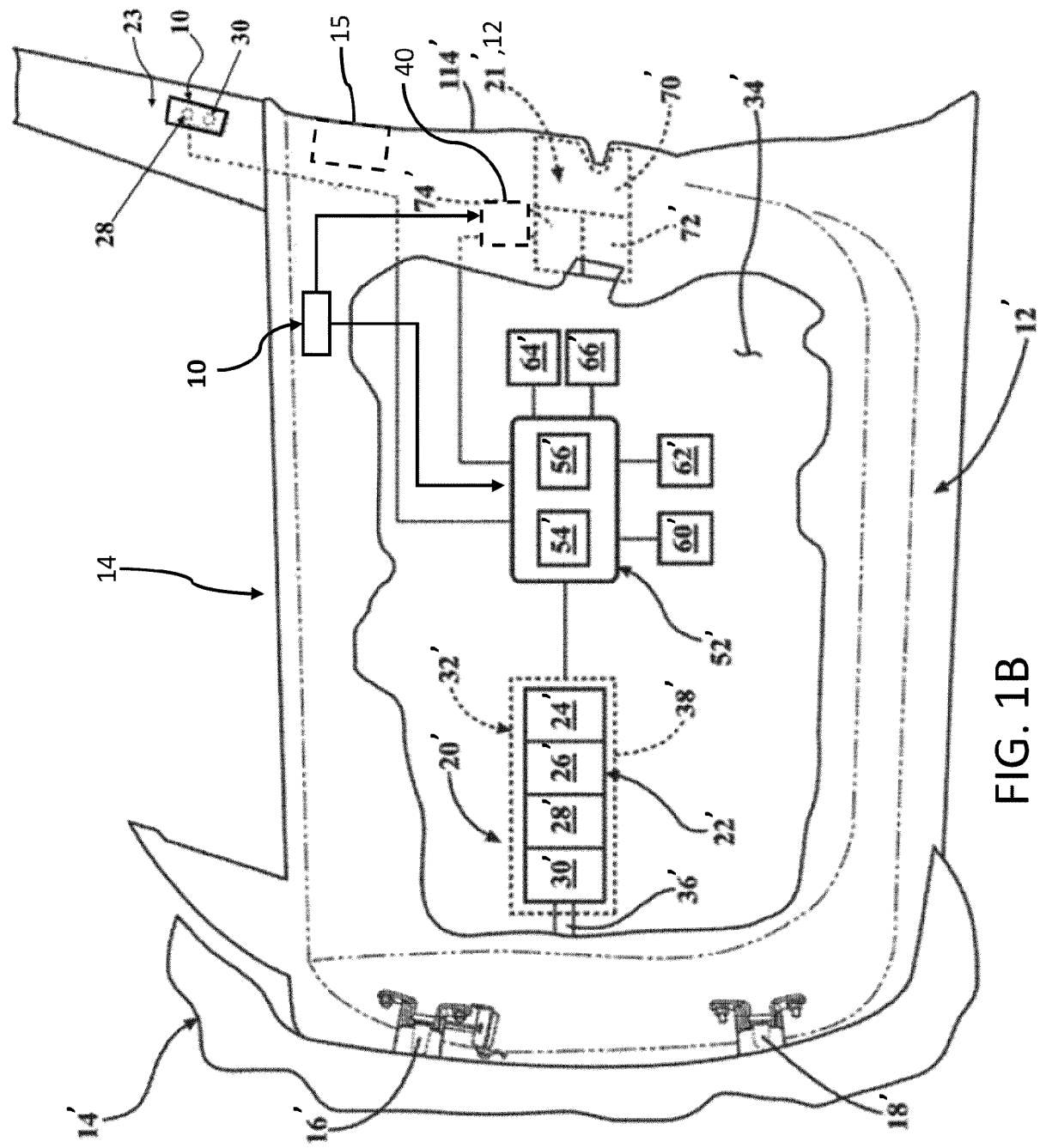
FIG. 1B is a diagrammatic view of a portion of the closure panel shown in FIG. 1A, with various components removed for clarity purposes only, in relation to a portion of the vehicle body and which is equipped with a user interface assembly, in accordance with an illustrative embodiment.

Referring now to FIGS. 1A and 1B, there is provided a power door actuation system 20' is diagrammatically shown in FIG. 1B to include a power-operated swing door presenter mechanism, also referred to as power swing door actuator 32', comprised of an electric motor 24', a reduction geartrain 26', a slip clutch 28', and a drive mechanism 30' which together define powered door presenter assembly 22' that is mounted within an interior chamber 34' of door 14, also referred to as door 12', for moving door 14. Presenter assembly 22' also includes a connector mechanism 36' configured to connect an extensible member of drive mechanism 30' to a portion of vehicle body 14'. Other types of presenter mechanisms may be provided, such as those whereby the connector mechanism 36' remains disconnected with from a portion of vehicle body 14' and is configured to urge or "push" the door 12' to a "presented position" (e.g., to create a 20 mm and 70 mm gap between the door edge 114' and the vehicle body 14'). Presenter assembly 22' further includes a support structure, such as an actuator housing 38', configured to be secured to door 12' within chamber 34' and to enclose electric motor 24', reduction geartrain 26', slip clutch 28' and drive mechanism 30' therein.

As also shown, an electronic control module 52', also referred to as an electronic control unit or controller, is in communication with electric motor 24' for providing electric control signals thereto. Electronic control module 52' may also be in communication with user interface assembly/system 10 as described herein below for receiving control signals thereto, for example to command electronic control module 52' to control actuation system 20'. Electronic control system, also referred to electronic control module 52', may include a microprocessor 54' and a memory 56' having executable computer readable instructions stored thereon for execution by the microprocessor 54'. Electronic control module 52' may include hardware and/or software components. Electronic control module 52' can be integrated into, or directly connected to, actuator housing 38' or may be a remotely located device within door chamber 34' or may be integrated into latch assembly 21'.

Although not expressly illustrated, electric motor 24' can include Hall-effect sensors for monitoring a position and speed of vehicle door 12' during movement between its open and closed positions. For example, one or more Hall-effect sensors may be provided and positioned to send signals to electronic control module 52' that are indicative of rotational movement of electric motor 24' (e.g., a motor shaft) and indicative of the rotational speed of electric motor 24', e.g., based on counting signals from the Hall-effect sensor detecting a target on a motor output shaft. In situations where the sensed motor speed is greater than a threshold speed and where the current being supplied to the motor 24' (e.g., as detected by a current sensor or sensing circuitry) registers a significant change in the current draw, electronic control module 52' may determine that the user is manually moving door 12' while motor 24' is also operating, thus moving vehicle door 14. Electronic control module 52' may then send a signal to electric motor 24' to stop motor 24' and may even disengage slip clutch 28' (if provided) to facilitate manual override movement. Conversely, when electronic control module 52' is in a power open or power close mode and the Hall-effect sensors indicate that a speed of electric motor 24' is less than a threshold speed (e.g., zero) and a current spike is registered either directly or indirectly by microprocessor 54' and/or any current sensing circuity, electronic control module 52' may determine that an obstacle is in the way of vehicle door 12', in which case the electronic control system may take any suitable action, such as sending a signal to turn off electric motor 24'. As such, electronic control module 52' receives feedback from the Hall-effect sensors to ensure that a contact obstacle has not occurred during movement of vehicle door 12' from the closed position to the partially-open position, or vice versa. Other position sensing techniques to determine that the door 12' is being moved, either by the electrical motor 24' and/or a manual user control are also possible.

As is schematically shown in FIG. 1B, electronic control module 52' may be in communication with a remote key fob 60' and/or with an external door-mounted switch 62' (contact such as a piezoelectric switch, or contactless such as a capacitive sensor) for receiving a request from a user to open or close vehicle door 12'. Put another way, electronic control module 52' receives a command signal from either remote key fob via a key fob sensor 60' and/or door switch 62' to initiate an opening or closing of vehicle door 12'. Upon receiving a command signal, electronic control module 52' proceeds to provide a signal to electric motor 24' in the form of a pulse width modulated voltage (for speed control) as an example to turn on motor 24' and initiate pivotal swinging movement of vehicle door 12'. While providing the signal, electronic control module 52' also obtains feedback from the Hall-effect sensors of electric motor 24' to ensure that a contact obstacle has not occurred. If no obstacle is present, motor 24' will continue to generate a rotational force to actuate spindle drive mechanism 30'. Once vehicle door 12' is positioned at the desired location, motor 24' is turned off and the "self-locking" gearing associated with gearbox 26' causes vehicle door 12' to continue to be held at that location, thereby providing an automatic door checking function. If a user tries to move vehicle door 12' to a different operating position, electric motor 24' will first resist the user's motion (thereby replicating a door check function) and eventually release and allow door 12' to move to the newly desired location. Again, once vehicle door 12' is stopped, electronic control module 52' will provide the required power to electric motor 24' to hold it in that position. If the user provides a sufficiently large motion input to vehicle door 12' (i.e., as is the case when the user wants to close the door), electronic control module 52' will recognize this motion via the Hall effect pulses and proceed to execute a full closing operation for vehicle door 12'.

Electronic control module 52' can also receive an additional input from proximity sensor, such as a radar sensor 64' positioned on a portion of vehicle door 12', such as on a door mirror 65' or the like. Radar sensor 64' detects if an obstacle, such as another car, tree, or post, is near or in close proximity to vehicle door 12'. If such an obstacle is present, radar sensor 64' will send a signal to electronic control module 52' and electronic control module 52' will proceed to turn off electric motor 24' to stop movement of vehicle door 12', thereby preventing vehicle door 12' from hitting the obstacle. This provides a non-contact obstacle avoidance system. In addition, or optionally, a contact obstacle avoidance system, such as a pinch detection system, can be placed in vehicle 10' which includes a contact sensor 66 mounted to door, such as in association with molding component 67', and which is operable to send a signal to controller 52' that an obstacle is detected, such as a user's finger detected in a gap between the vehicle body 14' and the door 12'.

Power door actuation system 20' is also shown schematically in FIG. 1B with latch assembly 21' having a latch mechanism 70', a latch release mechanism 72', and a power-operated release actuator such as an electric power release motor 74'. For purposes of illustration only control module 52' is shown in communication with electric power release motor 74' so as to also act as a latch controller for controlling operation of latch assembly 21'. Alternatively, latch assembly 21' may be provided with its own latch controller 40 in a manner as described below. Control module 52' can be an integrated configuration or a pair of distinct controllers associated with presenter assembly 22' and latch assembly 21'. Key fob sensor 60' and/or door switch 62' are again used to authenticate the user and control the power release (and power lock) function.

Figure 2:
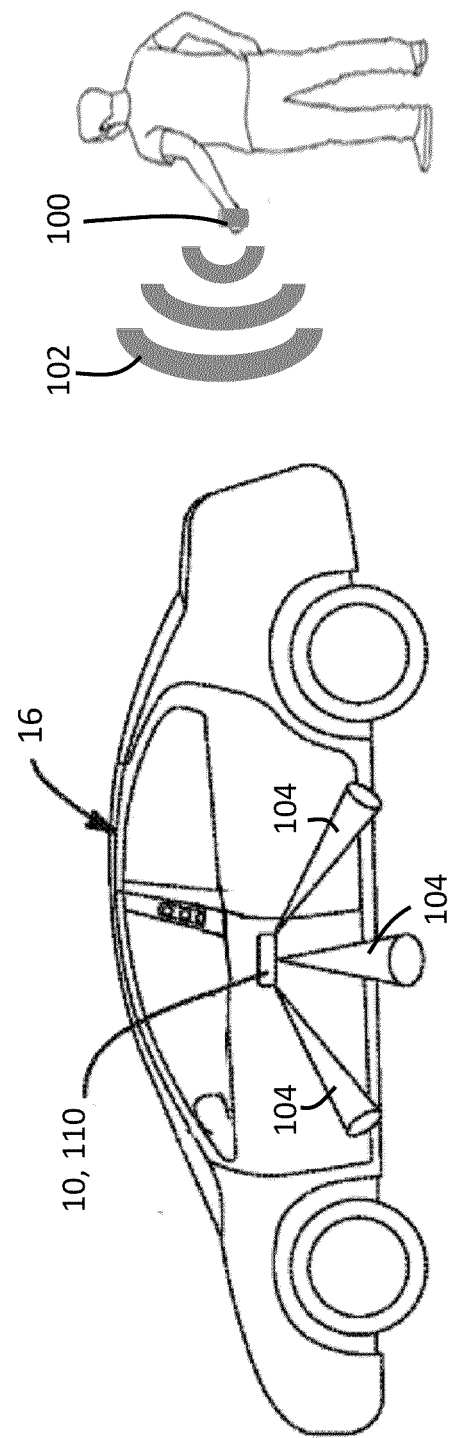
FIG. 2 is a side view of a vehicle and a person holding a device emitting RF signals.

FIG. 2 is a side view of a vehicle and a person holding a device 100 emitting a radio frequency (RF) signal 102. The device 100 may be a key fob or another device, such as a smartphone or a smart watch configured to emit the RF signal. Alternatively or additionally, the device 100 may be a Radio Frequency Identification (RFID) device for a passive keyless entry (PKE) of the vehicle 16, in which the user interface assembly/system 10 of the vehicle 16 is configured to respond to presence of the RF signal 102. FIG. 2 also shows RADAR beams 104 defining coverage areas sensed by a RADAR antenna within the user interface assembly/system 10, which takes the form of a handle assembly 110 of a side door of the vehicle 16.

Figure 3:
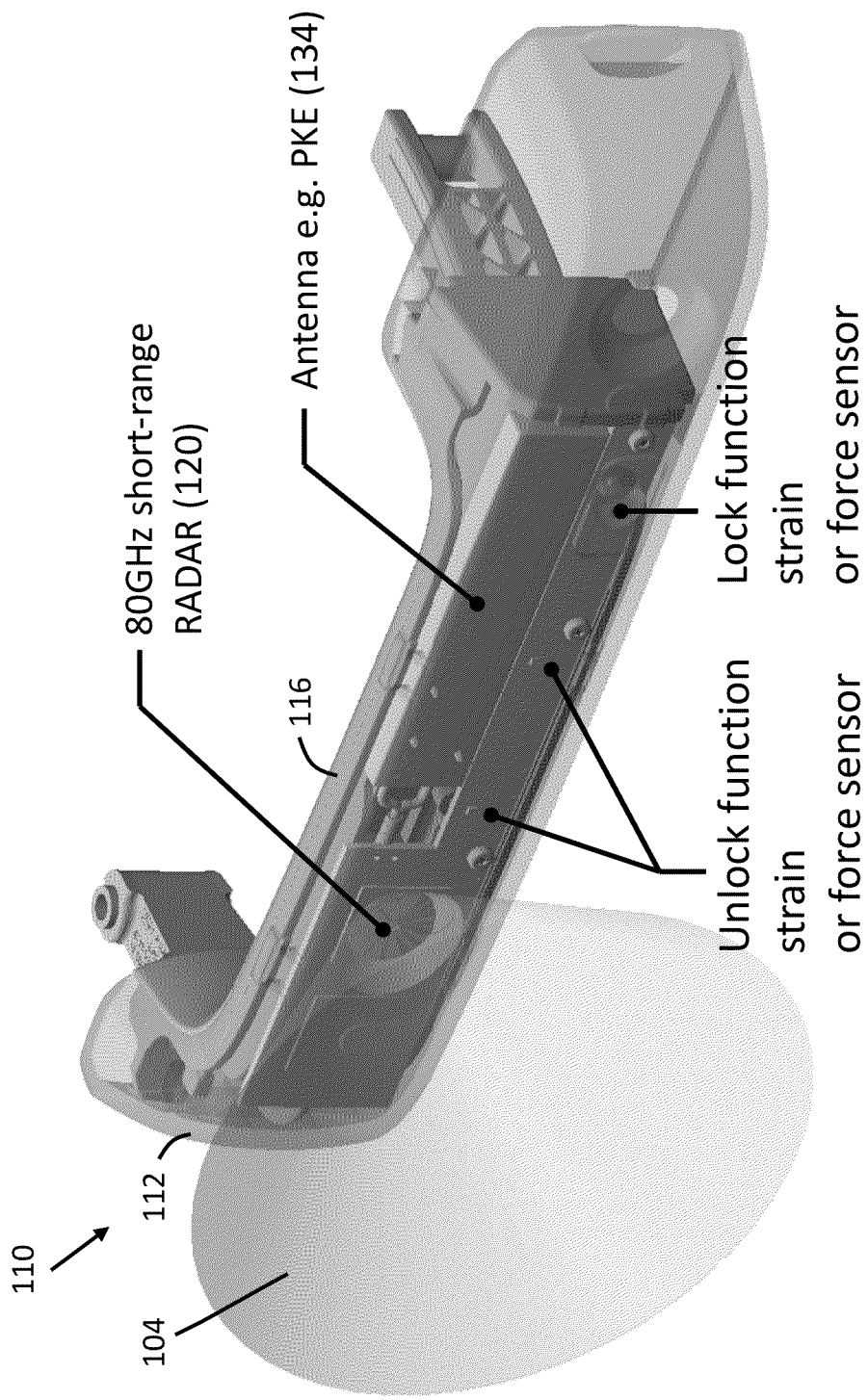
FIG. 3 is a partially transparent perspective view of a handle assembly in accordance with an embodiment of the disclosure.

FIG. 3 is a partially transparent perspective view of a handle assembly 110 in accordance with an embodiment of the disclosure. The handle assembly 110 shown in FIG. 3 includes an outer cover 112 disposed over a handle body 116. A RADAR antenna 120 is disposed within the handle assembly 110 between the outer cover 112 and the handle body 116 and adjacent to a radome region of the outer cover 112. The RADAR antenna 120 may be, for example, an 80 GHz short-range RADAR. A force-sensitive printed circuit board (PCB) 130 is also disposed within the handle assembly 110 between the outer cover 112 and the handle body 116. The PCB 130 is also disposed adjacent to the outer cover 112 and is co-planar with the RADAR antenna 120. The PCB 130 defines a cutout area 132 in which a passive keyless entry (PKE) antenna 134, or third sensor, is disposed. The PKE antenna 134 is also co-planar with the PCB 130 and the RADAR antenna 120.

FIGS. 4A - 4C show the handle assembly 110 in accordance with an embodiment of the disclosure. Specifically, the handle assembly 110 includes the outer cover 112, which defines an outer surface 113 that faces outwardly away from the vehicle. The outer surface 113 is a class-A surface that is intended to be seen and/or touched by a user (such as an outer surface of the handle body or portion of the door handle assembly that is seen and touched or grasped by the user). In the illustrated embodiment, the outer surface 113 is an outer surface of the handle body or handle portion of the door handle assembly. The handle body 116 of the handle assembly 110 also defines an inner wall or structure having an inner surface 117 that faces inwardly toward the vehicle. The inner surface 117 may also comprise a class-A surface that is intended to be seen and/or touched by the user.

As shown in FIGS. 4B and 4C, the RADAR beams 104 project through the radome area 122 of the outer cover 112 to and from the RADAR antenna 120 within the handle assembly 110, thus enabling the RADAR antenna 120 to sense objects near the vehicle. In some embodiments, and as shown in FIG. 4B, the radome area 122 of the outer cover 112 may have a thickness of 3.0 mm. In some embodiments, and as shown in FIG. 4B, the outer cover 112 may be formed of a fiber reinforced nylon material. More specifically, the outer cover 112 may be formed of a fiber reinforced nylon material comprising glass fibers. More specifically, the outer cover 112 may include 40% glass fiber. As can be seen from FIG. 4B, the sensors may be provided within a common plane so that a thin low profile sensor assembly may be provided within packaging space restricted environments, such as handles and appliques. While an external component is illustrated herein, it is envisioned that the teachings herein may be applied to other types of user interfaces of or for a motor vehicle, such as within the motor vehicle, such as, for example, to an inner door handle interface, to a stick shifter, to a steering wheel, or to a vehicle joystick and/or the like.

FIGS. 5A - 5B show parts within the handle assembly 110 in accordance with embodiments of the disclosure. Specifically, FIGS. 5A-5B show first posts 118 that are integrally formed with the handle body 116 and configured to transfer force from the inner surface 117 to the force-sensitive PCB 130. The force-based sensor may be provided as a force-sensitive microchip mounted to the printed circuit board 130, which may act as a common printed circuit board provided for also mounting of the radar sensor 120 as well as a microprocessor of controller 101 and other electrical components, for example, for operating the various sensors such as the passive keyless entry (PKE) antenna 134. The handle body 116 is configured to deform in response to a force applied to the inner surface 117. For example, the inner side of the handle body 116 may be thinned or otherwise locally weakened to provide controlled deformation in response to a pulling force by a user, whereas other portions of the inner side of the handle body outside of the thinned or weakened portions may not deform in response to pulling force by the user. This pulling force is sensed by the force-sensitive PCB 130, indicating that a user is pulling upon the handle assembly 110 (or pressing outwardly at the inwardly facing inner surface of the handle body).

FIGS. 6A - 6C show parts within the handle assembly 110 in accordance with embodiments of the disclosure. Specifically, FIGS. 6A - 6C show second posts 114 that are integrally formed with or disposed at an in contact with the outer cover 112 and configured to transfer force at the outer surface 113 to the force-sensitive PCB 130. The outer cover 112 is configured to deform in response to a force applied to the outer surface 113. For example, the outer cover 112 may be thinned or otherwise locally weakened to provide controlled deformation in response to pushing force by a user. This pushing force is sensed by the force-sensitive PCB 130, indicating that a user is pushing upon the handle assembly 110 (such as in a direction toward the vehicle). In some embodiments, and as shown in FIGS. 6A - 6C the outer surface 113 may be thinned or recessed in a particular region 113A that may function as a deformable button, whereas other portions of the outer surface 113 outside of the particular region 113A may not deform in response to pushing force by a user.

The force-sensitive PCB 130 or force sensitive chip may be configured to detect a positive and/or negative strain applied thereto and to output a signal to the controller 101, which is programmed, e.g., via software instructions stored in a local memory, to determine direction of application of a force to the force-sensitive PCB 130 or force sensitive chip. For example, a positive and negative strain may be detected based on whether the force on the force-sensitive PCB 130 or force sensitive chip is received from one side or the other side of the force-sensitive PCB 130 or force sensitive chip, as a result of a push on the front or outer side of the handle 110 as seen in FIG. 6C for indicating lock input to the handle 110, or as a result of a pull applied to the inner side of the handle 110 as seen in FIG. 5A for indicating an unlock input to the handle 110, for example, where each input may cause a respective negative or positive strain to the PCB 130 or force sensitive chip. Optionally, the system may provide a door unlocking function responsive to a pushing force at one exterior portion of the handle body and a door locking function responsive to a pushing force an another exterior portion of the handle body (such as for flush or retractable door handles or the like).

FIGS. 7A -7B show details of the PKE antenna 134, which is co-planar with the PCB 130 and electrically connected thereto.

Figure 8A:
FIG. 8A is a finite element analysis (FEA) plot showing a front view of an inner handle cover and illustrating forces applied by four fingers on an inside surface thereof.
Figure 8B:
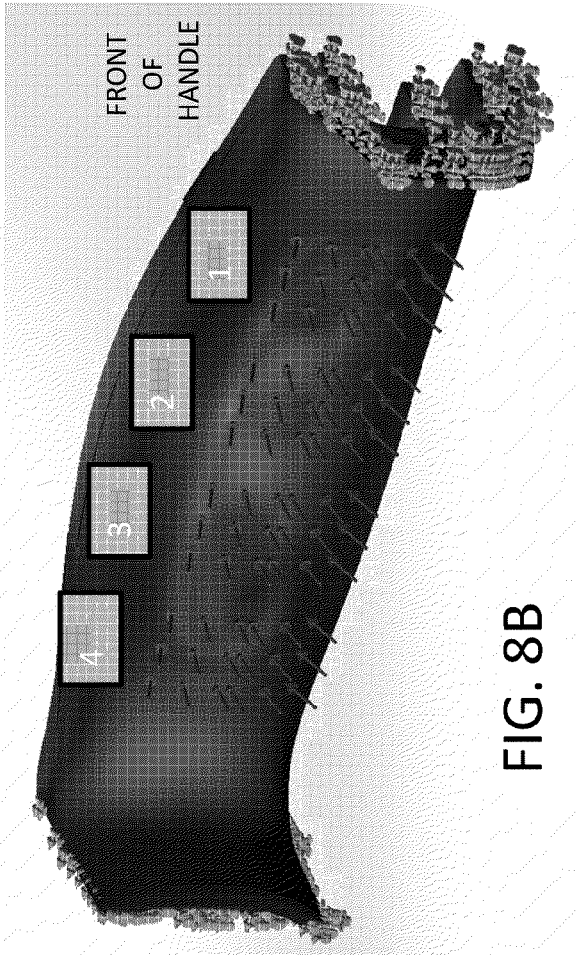
FIG. 8B is a FEA plot showing a rear view of the inner handle cover of FIG. 8A.
Figure 8C:
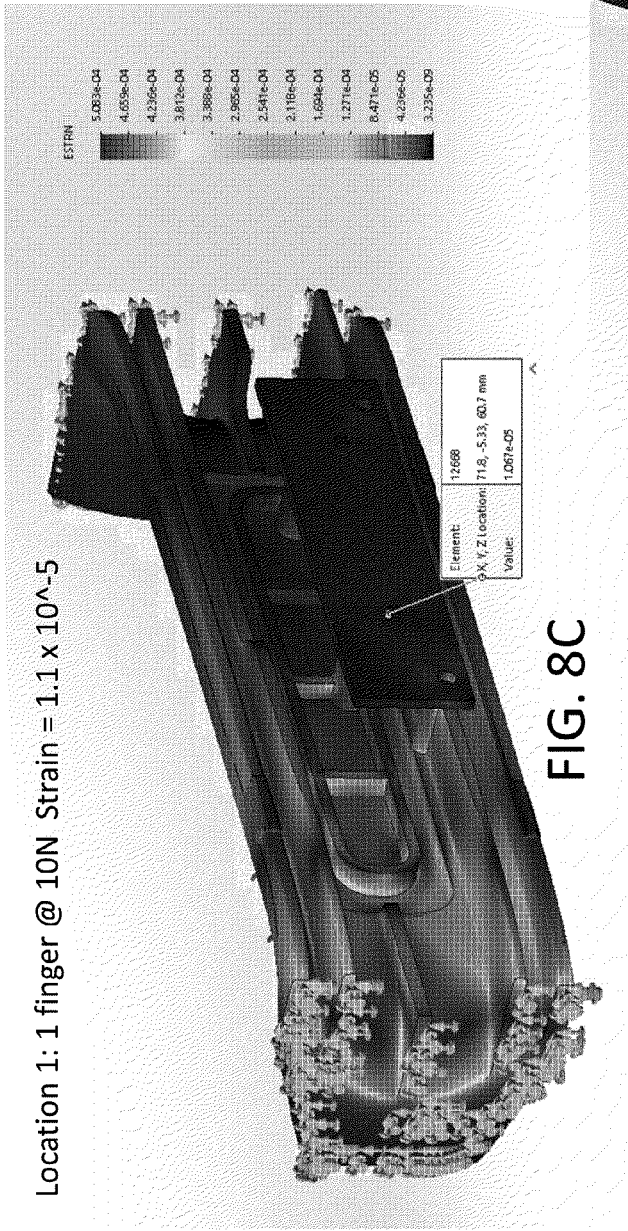
FIG. 8C is a FEA plot showing a rear view of the inner handle cover of FIG. 8A and illustrating internal strains resulting from a 10N force at finger location 1.
Figure 8D:
FIG. 8D is a FEA plot showing a rear view of the inner handle cover of FIG. 8A and illustrating internal strains resulting from a 10N force at finger location 2.
Figures 8E, 8F:
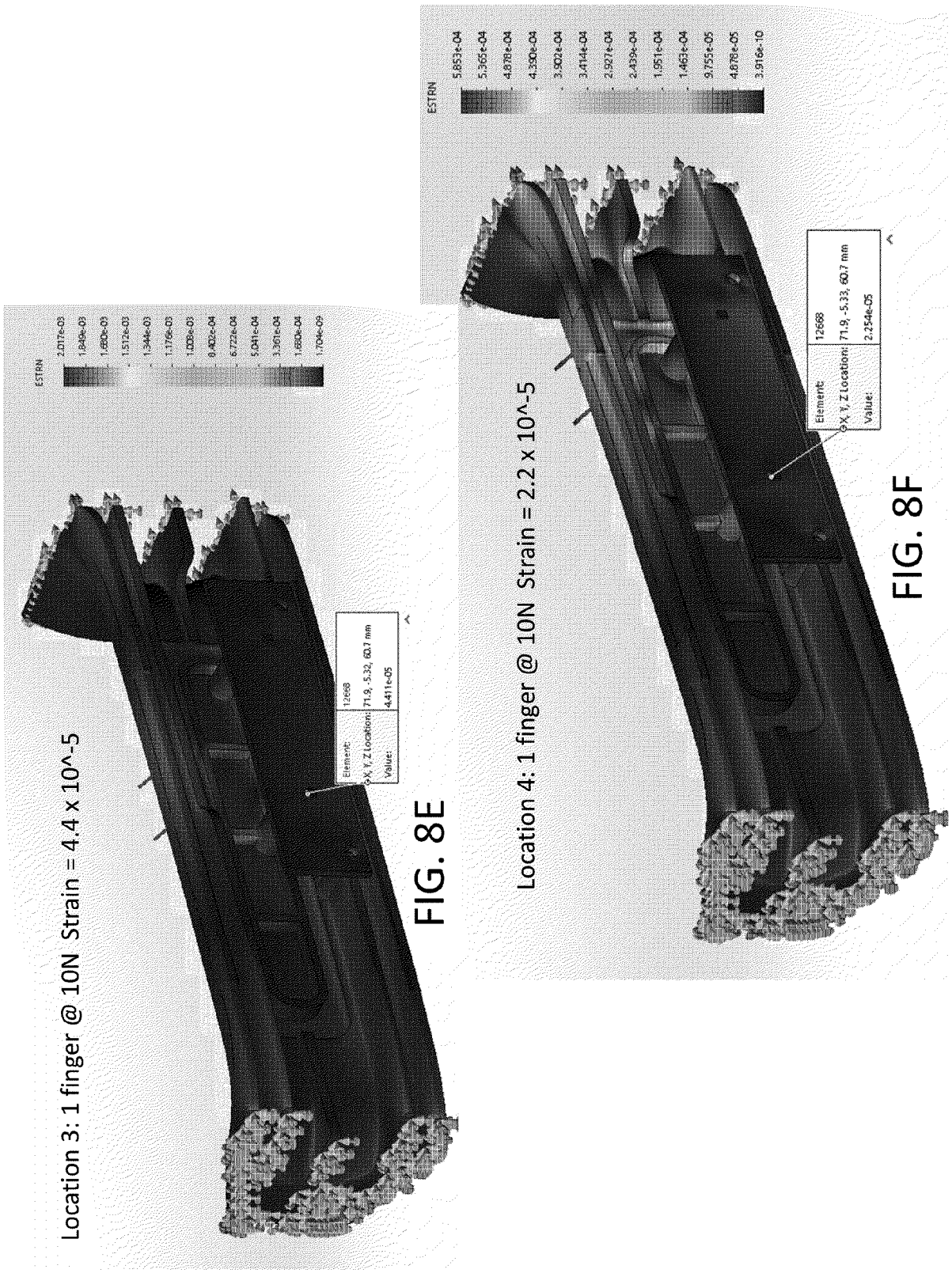
FIG. 8E is a FEA plot showing a rear view of the inner handle cover of FIG. 8A and illustrating internal strains resulting from a 10N force at finger location 3.
FIG. 8F is a FEA plot showing a rear view of the inner handle cover of FIG. 8A and illustrating internal strains resulting from a 10N force at finger location 4.
Figure 9:
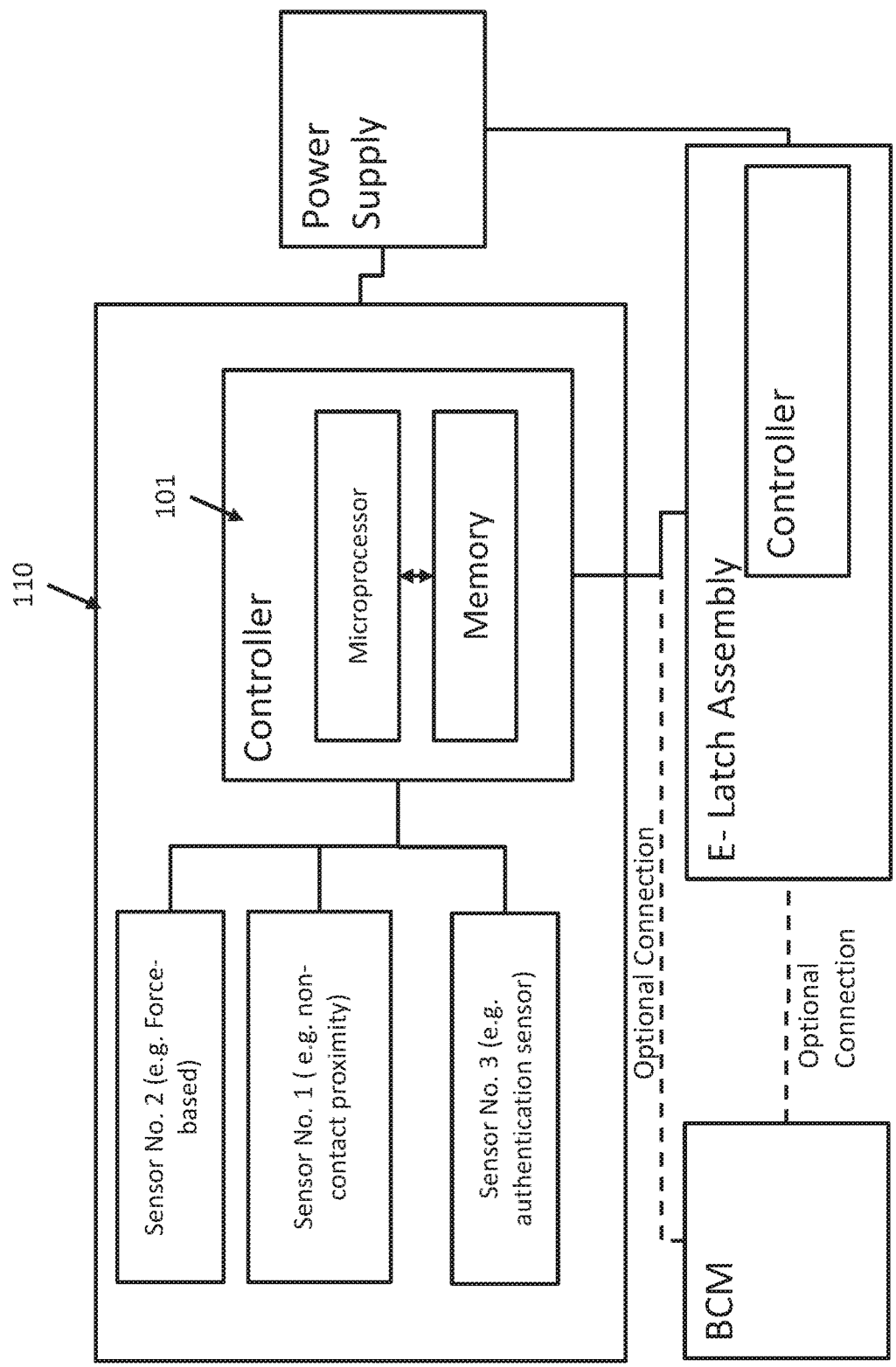
FIG. 9 is a system block diagram of the multi-sensor system according to an illustrative example.
Figure 10:
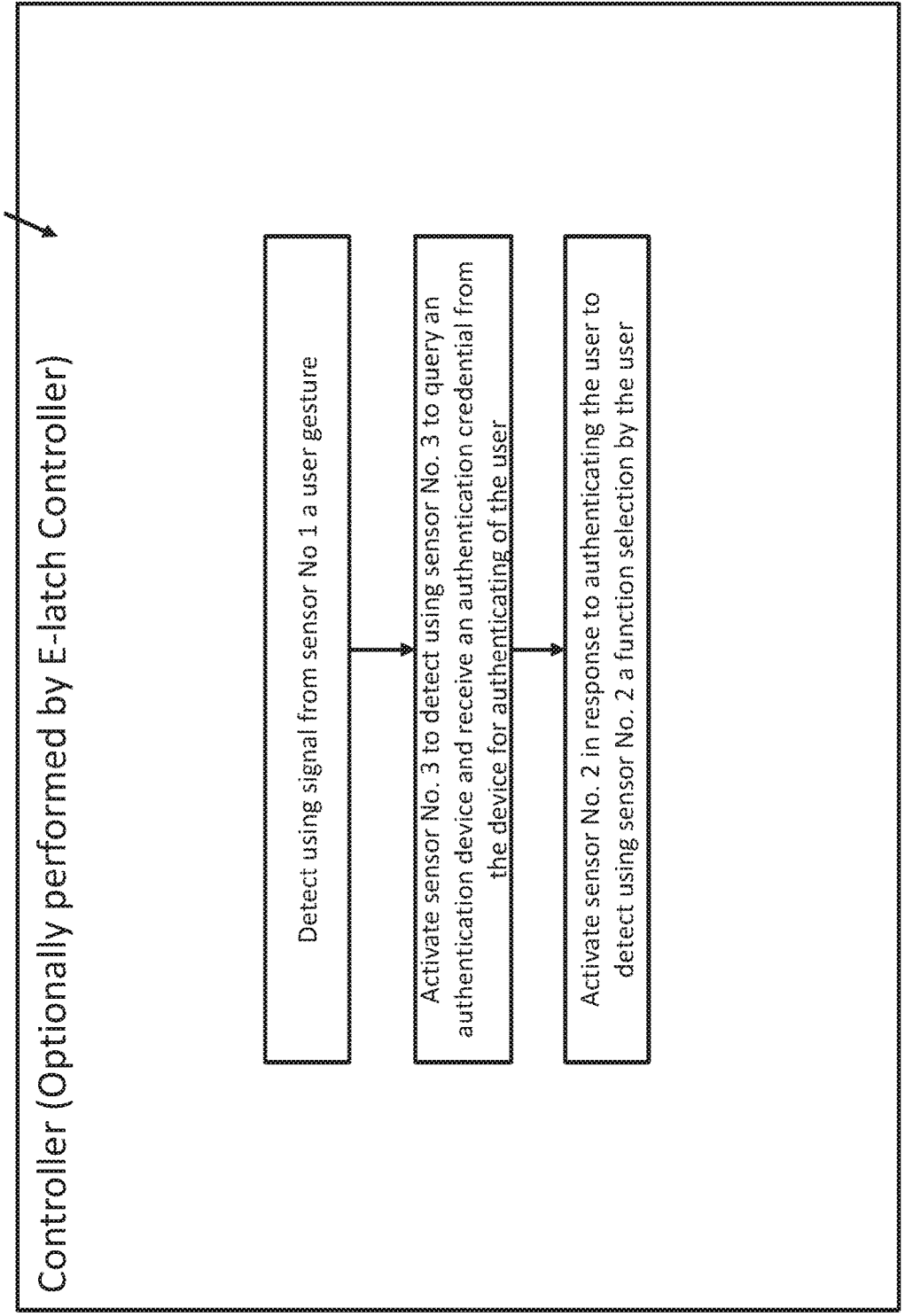
FIG. 10 is an illustrative flowchart of programming steps implemented by the controller of the multi-sensor system of FIG. 9, in accordance to an illustrative example.

FIGS. 8A-8E show finite element analysis (FEA) plots of a handle body 116, which may also be called an inner handle cover 116. Specifically, FIGS. 8A - 8B illustrate forces applied by four fingers on an inside surface thereof of the handle body 116. FIG. 8C illustrates internal strains in the handle body 116 resulting from a 10N force at finger location 1. FIG. 8D illustrates internal strains in the handle body 116 resulting from a 10N force at finger location 2. FIG. 8E illustrates internal strains in the handle body 116 resulting from a 10N force at finger location 3. FIG. 8F illustrates internal strains in the handle body 116 resulting from a 10N force at finger location 4.

Therefore, the vehicular exterior component may comprise an exterior door handle assembly at a side door (such as a driver-side door or a passenger side door) of a vehicle (or a rear door or liftgate or tailgate of a vehicle). A force-based sensor may be disposed within the handle portion of the door handle assembly and may sense or detect a force applied at an outer wall or surface of the handle portion. The force-based sensor may be configured to sense an inwardly directed force (such as pushing at an outer surface of the door handle), such as for a locking function (whereby the door is locked when such an inwardly directed force is detected) and/or to sense an outwardly directed force (such as pulling at the handle portion or pressing against an inner or inwardly facing surface of the handle portion, which may face toward a pocket region of the door handle), such as for an unlocking function (whereby the door is unlocked when such an outwardly directed force is detected). The system may trigger the door lock or unlock function responsive to sensing by the force-based sensor of a respective force at or above a threshold force or level, such as, for example, sensing of a force at the door handle portion that is at or above 5 N or at or above 10 N or at or above 20 N or any other threshold force applied at the handle portion.

Another sensor may be disposed in the exterior door handle assembly or handle portion of the exterior door handle assembly, and the other sensor may be configured to transmit electromagnetic radiation through the outer wall of the handle portion or to receive electromagnetic radiation through the outer wall of the handle portion. Optionally, the received radiation or signals may be signals reflected off objects present in close proximity to the vehicle door, whereby the door unlock function may be restricted if an object is detected that will impact the door if the door is opened. Optionally, the other sensor may receive radiation or signals transmitted by another device, and/or the received reflected radiation or signals may be processed, for detecting and/or identifying an authorized user of the vehicle that is exterior the vehicle and approaching the vehicle, whereby the door unlock function may be restricted unless an authorized user is determined to be present at the vehicle.

Optionally, the exterior assembly may include a sensor that is used for object detection at the exterior region adjacent to the vehicle (to determine whether or not the vehicle door can be opened without impacting a detected object) and may include another sensor that determines whether an authorized user is at the vehicle. Thus, the system may, responsive to determination that an authorized user is present at the vehicle, unlock the door responsive to the force-based sensor detecting a threshold force at the door handle. The system may also function to limit or restrict or preclude unlocking or opening of the door responsive to detection of an obstacle in the path of the door. Thus, the door may be unlocked only when three conditions are met, namely, identification of an authorized user (via a key fob or passive entry device), detection of an unlocking force at the door handle, and no detection of an obstacle in the path of the door.

The exterior component may utilize aspects of the components and handle assemblies described in U.S. Pat. Nos. 10,569,697; 9,484,626; 8,786,401 and/or 6,977,619, and/or U.S. Publication Nos. US-2020-0130646; US-2020-0102773 and/or US-2014-0292004, which are all hereby incorporated herein by reference in their entireties.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A vehicular door handle assembly, the vehicular door handle assembly comprising:
   a handle portion configured to be disposed at a door of a vehicle, the handle portion comprising an outer wall, wherein, with the handle portion disposed at the door of the vehicle, the handle portion is contactable by a user to open the door of the vehicle;
   a first sensor disposed within the handle portion, wherein the first sensor is configured to communicate with a remote device that is located exterior the vehicle and that is located within communication range of the first sensor;
   a second sensor disposed within the handle portion;
   wherein a deformable portion of the outer wall is configured to deform responsive to force applied at the deformable portion of the outer wall, and wherein the second sensor is configured to sense force applied at the deformable portion of the outer wall, and wherein non-deformable portions of the outer wall do not deform responsive to force applied at the outer wall;
   wherein, with the handle portion disposed at the door of the vehicle, the first sensor, responsive to communication with the remote device, communicates a first signal to an electronic control unit;
   wherein, with the handle portion disposed at the door of the vehicle, the electronic control unit determines proximity of the remote device to the vehicular door handle assembly responsive to the first signal;
   wherein, with the handle portion disposed at the door of the vehicle, the second sensor communicates a second signal to the electronic control unit for controlling the vehicular door handle assembly responsive to sensing by the second sensor of force applied by the user at the deformable portion of the outer wall; and
   wherein, responsive to the first signal and responsive to the second signal, the electronic control unit allows the door of the vehicle to be opened by the user.

2. The vehicular door handle assembly of claim 1, wherein the outer wall comprises an outer class-A surface of the vehicular door handle assembly.

3. The vehicular door handle assembly of claim 2, wherein the outer class-A surface presents a smooth and uninterrupted surface in a region of the outer wall corresponding to at least one selected from the group consisting of the first sensor and the second sensor.

4. The vehicular door handle assembly of claim 1, wherein the first sensor comprises an antenna and the second sensor comprises a force-based sensor, and wherein at least a portion of the outer wall is configured to allow for transmission of electromagnetic radiation for communication between the antenna and the remote device.

5. The vehicular door handle assembly of claim 4, wherein the outer wall is configured to be electromagnetically transparent to electromagnetic radiation.

6. The vehicular door handle assembly of claim 1, wherein the electronic control unit is disposed within the vehicular door handle assembly.

7. The vehicular door handle assembly of claim 6, wherein the electronic control unit and the first sensor and the second sensor are mounted on a printed circuit board.

8. The vehicular door handle assembly of claim 7, wherein the printed circuit board comprises a first side and a second side separated by a thickness of the printed circuit board, and wherein the first sensor is provided on the first side and the second sensor is provided on at least one selected from the group consisting of the first side and the second side.

9. The vehicular door handle assembly of claim 8, wherein the second sensor comprises an array of sensors.

10. The vehicular door handle assembly of claim 1, wherein the first sensor is configured to receive an electromagnetic signal from the remote device, and wherein the first sensor, responsive to receiving the electromagnetic signal from the remote device, communicates the first signal to the electronic control unit for authenticating the remote device.

11. The vehicular door handle assembly of claim 1, further comprising a third sensor electrically coupled to the electronic control unit.

12. The vehicular door handle assembly of claim 11, wherein the third sensor comprises an antenna, and wherein the antenna of the third sensor is configured as a short-range RADAR antenna, and wherein the antenna of the third sensor is configured to, with the vehicular door handle assembly mounted at a vehicle, receive a first electromagnetic signal as a reflection from an object located exterior the vehicular door handle assembly, and wherein the first sensor is configured to receive a second electromagnetic signal from the remote device, and wherein the first sensor, responsive to receiving the second electromagnetic signal from the remote device, communicates the first signal to the electronic control unit for authenticating the remote device.

13. The vehicular door handle assembly of claim 12, wherein the electronic control unit (i) is configured to determine presence of the object located exterior the vehicular door handle assembly responsive to receiving the first electromagnetic signal, (ii) is configured to authenticate the remote device responsive to receiving the first signal from the first sensor and based on the second electromagnetic signal received from the remote device, and (iii) is configured to control the vehicular door handle assembly responsive to receiving the second signal from the second sensor after authenticating the remote device.

14. The vehicular door handle assembly of claim 12, wherein the first sensor, the second sensor, and the third sensor are disposed within a common plane.

15. The vehicular door handle assembly of claim 14, wherein a printed circuit board is provided within the common plane, the printed circuit board comprising a cutout in which the third sensor is disposed.

16. The vehicular door handle assembly of claim 15, wherein the second sensor includes a force-sensitive printed circuit board, and wherein the antenna of the third sensor is disposed in a common plane with the force-sensitive printed circuit board.

17. The vehicular door handle assembly of claim 1, further comprising structure extending from the outer wall into the handle portion and configured to apply force to the second sensor responsive to force applied to the deformable portion of the outer wall.

18. The vehicular door handle assembly of claim 1, wherein, with the handle portion disposed at the door of the vehicle, (i) the first sensor faces outwardly away from the vehicle and (ii) the second sensor at least one selected from the group consisting of faces outwardly away from the vehicle and faces inwardly towards the vehicle.

19. The vehicular door handle assembly of claim 18, wherein the deformable portion of the outer wall of the handle portion includes a surface that, with the handle portion disposed at the door of the vehicle, faces toward the vehicle, and wherein the second sensor is responsive to force applied to the surface of the deformable portion of the outer wall of the handle portion that faces toward the vehicle.

20. The vehicular door handle assembly of claim 19, wherein the handle portion is configured to be pivotally coupled to the door of the vehicle.

21. The vehicular door handle assembly of claim 1, wherein the outer wall comprises a class-A surface disposed over the second sensor, and wherein the second sensor is responsive to force applied to the class-A surface of the outer wall, and wherein the class-A surface includes an outer surface that, with the handle portion disposed at the door of the vehicle, faces outwardly from the vehicle, and wherein the first sensor comprises an antenna disposed within the handle portion and configured to transmit radio-frequency (RF) electromagnetic radiation through the outer wall or to receive RF electromagnetic radiation through the outer wall.

22. The vehicular door handle assembly of claim 1, wherein the second sensor is spaced from the first sensor within the handle portion.

23. The vehicular door handle assembly of claim 1, wherein the first sensor is disposed within the handle portion adjacent to a non-deformable portion of the outer wall of the handle portion, and wherein the second sensor is disposed within the handle portion adjacent to the deformable portion of the outer wall of the handle portion.

24. The vehicular door handle assembly of claim 23, wherein the first sensor comprises an antenna, and wherein at least the non-deformable portion of the outer wall is configured to allow for transmission of electromagnetic radiation for communication between the antenna and the remote device.

25. A vehicular door handle assembly, the vehicular door handle assembly comprising:
a handle portion configured to be disposed at a door of a vehicle, the handle portion comprising an outer wall, wherein, with the handle portion disposed at the door of the vehicle, the handle portion is contactable by a user to open the door of the vehicle;
a first sensor disposed within the handle portion, wherein the first sensor is configured to receive an electromagnetic signal from a remote device that is located exterior the vehicle and that is located within signal range of the first sensor;
a second sensor disposed within the handle portion;
wherein a deformable portion of the outer wall is configured to deform responsive to force applied at the deformable portion of the outer wall, and wherein the second sensor is configured to sense force applied at the deformable portion of the outer wall, and wherein non-deformable portions of the outer wall do not deform responsive to force applied at the outer wall;
an electronic control unit disposed at the vehicle;
wherein, with the handle portion disposed at the door of the vehicle, the first sensor, responsive to receiving the electromagnetic signal from the remote device, communicates a first signal to the electronic control unit for authenticating the remote device;
wherein, with the handle portion disposed at the door of the vehicle, the electronic control unit authenticates the remote device based at least in part on the first signal;
wherein, with the handle portion disposed at the door of the vehicle, the second sensor communicates a second signal to the electronic control unit for controlling the vehicular door handle assembly responsive to sensing by the second sensor of force applied by the user at the deformable portion of the outer wall; and
wherein, responsive to the electronic control unit authenticating the remote device based at least in part on the first signal, and responsive to the second signal, the electronic control unit allows the door of the vehicle to be opened by the user.

26. The vehicular door handle assembly of claim 25, wherein the outer wall comprises an outer class-A surface of the vehicular door handle assembly, and wherein the outer class-A surface presents a smooth and uninterrupted surface in a region of the outer wall corresponding to at least one selected from the group consisting of the first sensor and the second sensor.

27. The vehicular door handle assembly of claim 25, wherein the first sensor comprises an antenna, and wherein at least a portion of the outer wall is configured to allow for transmission of electromagnetic radiation.

28. The vehicular door handle assembly of claim 25, wherein the electronic control unit and the first sensor and the second sensor are mounted on a printed circuit board.

29. The vehicular door handle assembly of claim 28, wherein the printed circuit board comprises a first side and a second side separated by a thickness of the printed circuit board, and wherein the first sensor is provided on the first side and the second sensor is provided on at least one selected from the group consisting of the first side and the second side.

30. The vehicular door handle assembly of claim 25, further comprising structure extending from the outer wall into the handle portion and configured to apply force to the second sensor responsive to force applied to the deformable portion of the outer wall.

31. The vehicular door handle assembly of claim 25, wherein, with the handle portion disposed at the door of the vehicle, (i) the first sensor faces outwardly away from the vehicle and (ii) the second sensor at least one selected from the group consisting of faces outwardly away from the vehicle and faces inwardly towards the vehicle.

32. The vehicular door handle assembly of claim 31, wherein the deformable portion of the outer wall of the handle portion includes a surface that, with the handle portion disposed at the door of the vehicle, faces toward the vehicle, and wherein the second sensor is responsive to force applied to the surface of the deformable portion of the outer wall of the handle portion that faces toward the vehicle.

33. The vehicular door handle assembly of claim 32, wherein the handle portion is configured to be pivotally coupled to the door of the vehicle.

34. The vehicular door handle assembly of claim 25, wherein the second sensor is spaced from the first sensor within the handle portion.

35. The vehicular door handle assembly of claim 25, wherein the first sensor is disposed within the handle portion adjacent to a non-deformable portion of the outer wall of the handle portion, and wherein the second sensor is disposed within the handle portion adjacent to the deformable portion of the outer wall of the handle portion.

36. A vehicular door handle assembly, the vehicular door handle assembly comprising:
   a handle portion configured to be disposed at a door of a vehicle, the handle portion comprising an outer wall, wherein, with the handle portion disposed at the door of the vehicle, the handle portion is contactable by a user to open the door of the vehicle;
   a printed circuit board disposed within the handle portion;
   a first sensor disposed at the printed circuit board, wherein the first sensor is configured to communicate with a remote device that is located exterior the vehicle and that is located within communication range of the first sensor;
   a second sensor disposed at the printed circuit board;
   an electronic control unit disposed at the printed circuit board;
   wherein a deformable portion of the outer wall is configured to deform responsive to force applied at the deformable portion of the outer wall, and wherein the second sensor is configured to sense force applied at the deformable portion of the outer wall, and wherein non-deformable portions of the outer wall do not deform responsive to force applied at the outer wall;
   wherein, with the handle portion disposed at the door of the vehicle, (i) the first sensor faces outwardly away from the vehicle and (ii) the second sensor faces inwardly towards the vehicle;
   wherein, with the handle portion disposed at the door of the vehicle, the first sensor, responsive to communication with the remote device, communicates a first signal to the electronic control unit;
   wherein, with the handle portion disposed at the door of the vehicle, the electronic control unit determines proximity of the remote device to the vehicular door handle assembly responsive to the first signal;
   wherein, with the handle portion disposed at the door of the vehicle, the second sensor communicates a second signal to the electronic control unit for controlling the vehicular door handle assembly responsive to sensing by the second sensor of force applied by the user at the deformable portion of the outer wall; and
   wherein, responsive to the first signal and responsive to the second signal, the electronic control unit allows the door of the vehicle to be opened by the user.

37. The vehicular door handle assembly of claim 36, wherein the outer wall comprises an outer class-A surface of the vehicular door handle assembly, and wherein the outer class-A surface presents a smooth and uninterrupted surface in a region of the outer wall corresponding to at least one selected from the group consisting of the first sensor and the second sensor.

38. The vehicular door handle assembly of claim 36, wherein the first sensor comprises an antenna and the second sensor comprises a force-based sensor, and wherein at least a portion of the outer wall is configured to allow for transmission of electromagnetic radiation for communication between the antenna and the remote device.

39. The vehicular door handle assembly of claim 36, wherein the printed circuit board comprises a first side and a second side separated by a thickness of the printed circuit board, and wherein the first sensor is disposed at the first side and the second sensor is disposed at the second side.

40. The vehicular door handle assembly of claim 36, wherein the first sensor is configured to receive an electromagnetic signal from the remote device, and wherein the first sensor, responsive to receiving the electromagnetic signal from the remote device, communicates the first signal to the electronic control unit for authenticating the remote device.

41. The vehicular door handle assembly of claim 36, further comprising structure extending from the outer wall into the handle portion and configured to apply force to the second sensor responsive to force applied to the deformable portion of the outer wall.

42. The vehicular door handle assembly of claim 36, wherein the deformable portion of the outer wall of the handle portion includes a surface that, with the handle portion disposed at the door of the vehicle, faces toward the vehicle, and wherein the second sensor is responsive to force applied to the surface of the deformable portion of the outer wall of the handle portion that faces toward the vehicle.

43. The vehicular door handle assembly of claim 36, wherein the second sensor is spaced from the first sensor within the handle portion.

44. The vehicular door handle assembly of claim 36, wherein the first sensor is disposed within the handle portion adjacent to a non-deformable portion of the outer wall of the handle portion, and wherein the second sensor is disposed within the handle portion adjacent to the deformable portion of the outer wall of the handle portion.

* * * * *